United States Patent Office 3,258,464
Patented June 28, 1966

---

3,258,464
PYRIDYL-1,3,5-OXATHIAZOLINONES AND PROCESS FOR THEIR PRODUCTION
Klaus Sasse, Cologne-Stammheim, and Maria Brömmelhues, Wuppertal-Sonnborn, Germany, assignors to Farbenfabriken Bayer Aktiengesellschaft, Leverkusen, Germany, a German corporation
No Drawing. Filed Oct. 27, 1964, Ser. No. 406,928
Claims priority, application Germany, Nov. 16, 1963, F 41,301
3 Claims. (Cl. 260—294.8)

The present invention relates to new pyridyl-1,3,5-oxathiazolinones which possess biocidal properties, as well as a process for their production.

It is an object of the present invention to provide new agents having biocidal properties, especially fungicidal and fungistatic properties as well as insecticidal, acaricidal and herbicidal properties.

It has now been found that the new 4-pyridyl-1,3,5-oxathiazolinones-(2) of the formula (I) 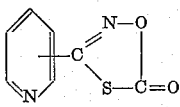

possess strong biocidal properties.

It has further been found that 4-pyridyl-1,3,5-oxathiazolinones-(2) of the Formula I are obtained if pyridine-thiohydroxamic acids of the formula (II) 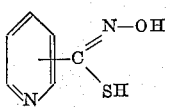

are reacted with phosgene in the presence of an acid-binding agent.

It is definitely surprising that the novel 4-pyridyl-1,3,5-oxathiazolinones-(2) possess a broad spectrum of biocidal properties, since it is not yet known for similar compounds to have such biocidal properties.

If α-pyridine-thiohydroxamic acid is used as starting material, the course of the reaction can be represented by the following scheme:

(III) 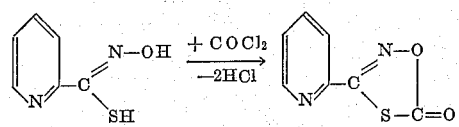

As starting materials for the present process, α, β and γ-pyridine-thiohydroxamic acids may be used. These three isomeric compounds are clearly characterised by Formula I.

Some of the pyridine thiohydroxamic acids needed as starting compounds are known. Thus, pyridine-4-thiohydroxamic acid is obtained by reaction of dithioisonicotinic acid with hydroxylamine [Berichte, 87, 827 (1954)]. They can be advantageously produced by chlorinating the known pyridine aldoximes according to the usual processes and reacting the pyridine hydroxamic chlorides thus obtained with alkali metal hydrosulphides in a likewise known manner. The course of the reaction is represented for α-pyridine aldoxime by the following scheme.

(IV) 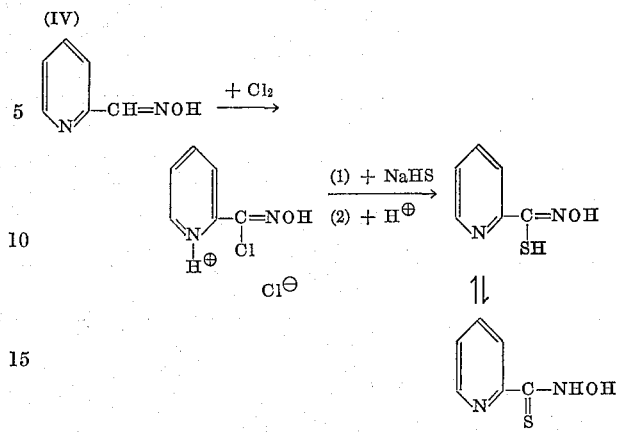

An example of the two-step production of the starting materials is given in Example 1.

As diluents for the reaction according to the present invention there may be mentioned water as well as organic solvents such as hydrocarbons, (benzine, benzene), chlorinated hydrocarbons (chloroform, chlorobenzenes), ethers (diethyl ether, dioxan, tetrahydrofuran), ketones (acetone, methyl ethyl ketone), carboxylic acid esters (ethyl acetate), nitriles (acetonitrile). As solvents, however, excess amines, e.g., pyridine, can also be used.

As acid binding agents the normally used inorganic acid-binding agents such as alkali metal and alkaline earth metal hydroxides, alkali metal and alkaline earth metal carbonates, and tertiary amines, e.g. pyridine, may be used.

The reaction temperatures may be varied within a wide range. In general, the process is operated at temperatures of between $-20$ and $+150°$ C., preferably between $-10$ and $+50°$ C.

The reaction can be performed without pressure or under pressure. In carrying out the process according to the invention, one mol of thiohydroxamic acid is reacted with one to three mols of phosgene. The acid-binding agent is applied in at least the twofold molecular amount calculated on the thiohydroxamic acid used, but more advantageously, in a twofold molecular amount calculated on the phosgene used.

The compounds obtained according to the invention possess a very wide range of biocidal properties. They are fungicidally and fungistatically active and can be used as leaf fungicides, e.g., against *Phytophthora infestans, Alternaia solani* and types of genuine mildew. They are, however, also suitable as soil fungicides, e.g., against *Tilletia tritici, Corticium rolfsii, Verticillium alboatrum, Thielaviopsis basicola, Fusarium culmorum,* and *Fusarium oxysporum.* They can furthermore also be used as insecticides, e.g., against flies, and as acaricides, e.g., against spider mites (*Tetranychus telarius*). The substances have moreover herbicidal properties and can therefore be used as selective weed-control agents.

Their application as fungicides in the hygiene sector is also possible, e.g., against *Trichophyton gypseum mentagrophytes, Candida albicans, Penicillium commune,* and *Saccharomyces cerevisiae.*

The compounds of the invention can be applied as such or in the form of the usual formulations, such as emulsifiable concentrates, spray powders, pastes, soluble powders, dusting agents and granulates. These are produced in known manner (cf. Agricultural Chemicals, March 1960, pages 35–38). The most important assistants are for this purpose: solvents, such as aromatics (e.g., xylene), chlorinated aromatics (e.g., chlorobenzene), paraffins (e.g., mineral oil fractions), alcohols (e.g., methanol), amines (e.g., ethanolamine), and also water; carriers, such as natural ground stone (e.g., kaolins, chalk) and synthetic ground stone (e.g., highly dispersed silicic acid); emulsifiers such as non-ionic and anionic emulsifiers (e.g. polyoxyethylene fatty acid esters, alkyl sulphonates), and dispersing agents such as lignin.

The active agents according to the invention can be present in the formulations in admixture with other known active agents, such as bacterides, fungicides, or insecticides.

The formulations contain in general from 0.1 to 95%, preferably from 0.5 to 90%, by weight of active agent.

The substances of the present invention as well as their formulations are applied in conventional manner, e.g. by scattering, spraying, atomising or spreading.

*Example A.—Agar plate test (test for fungitoxic effectiveness and breadth of the activity spectrum)*

To produce a suitable preparation of the active compound, the active compound is taken up in acetone.

The preparation of the active compound is added to potato dextrose agar, which has been liquefied by heating, in an amount sufficient to ensure that the desired concentration of active compound results. After thorough shaking to achieve a uniform dispersion of the active compound, the agar is poured into petri dishes under sterile conditions. When the mixture of substrate and active compound has solidified, test fungi from pure cultures are placed on it in small discs of 5 mm. diameter. The petri dishes are incubated for 3 days at 20° C.

After this time, the inhibiting action of the active compound on the mycelium growth is determined in different categories taking into account the untreated control. 0 means that no mycelium growth occurred, either on the treated substrate or on the inoculum, the symbol — means that mycelium growth occurred only on the inoculum, without spreading to the treated substrate, and the symbol + means that mycelium growth from the inoculum has spread to the treated substrate, similarly to the spreading to the untreated substrate of the control.

The active compounds, their concentrations, the test fungi and the inhibition effects achieved can be seen from the following table:

Test plants of about 5–15 cm. height are sprayed with the preparation of the active compound until just dew moist. After three weeks, the degree of damage to the plants is determined and characterised by the values 0–5, which have the following meaning:

0 no effect
1 a few slightly burnt spots
2 marked damage to leaves
3 some leaves and parts of stalks partially dead
4 plant partially destroyed
5 plant completely dead.

The active compounds, their concentrations and the results obtained can be seen from the following table:

TABLE.—POST-EMERGENCE-TEST

| Active agent | Active agent concentration in percent | Millet | Rape | Cotton | Wheat | Mustard | Tomato | Beans | Oats |
|---|---|---|---|---|---|---|---|---|---|
| 4-α-pyridyl-1,3,5-oxathiazolinone-(2) | 0.2 | 5 | 5 | 4–5 | 2 | 5 | 3 | 4–5 | |

*Example C.—Inhibition test*

Culture medium for *Aspergillus niger*: Beer agar.
Culture medium for Coli: Glucose bouillon.

One part by weight of active agent is taken up in 5 parts acetone and diluted with 95 parts by weight of water. From this preparation of active agent, in a test series of six test tubes, such quantities are added to the above-mentioned culture medium liquified by heating that the resulting concentrations of active agent therein are 1:4000 to 1:20,000. After solidification, the culture medium is inoculated with the test fungus.

After seven days' incubation, the growth of the test fungus is examined microscopically and the concentration determined in the whole series at which complete inhibition of the fungus has just occurred. If the concentration of the active agent in the culture medium is, e.g. 1:1000 the value 1000 represents the reciprocal inhibition value of the limiting concentration.

From the following tables the test fungi and the reciprocal inhibition values of the limiting concentrations are apparent.

TABLE.—INHIBITION-TEST

| Active agent | Test fungus | Reciprocal inhibition value of the limiting concentration |
|---|---|---|
| 4-α-pyridyl-1,3,5-oxathiazolinone-(2). | Aspergillus niger | 12,000 |
| | Coli | 12,000 |

TABLE.—AGAR PLATE TEST

| Active Agent | Concentration of Active agent in Substrate in p.p.m. | *Corticium rolfsii* | *Sclerotinia sclerotiorum* | *Verticillium alboatrum* | *Thielaviopsis basicola* | *Phytophthora cactorum* | *Fusarium culmarum* | *Fusarium oxysporum* | *Fusarium solani f. pisi* |
|---|---|---|---|---|---|---|---|---|---|
| 4-α-pyridyl-1,3,5-oxathiazolinone-(2) | 100 | — | — | — | — | — | — | — | — |
| | 10 | — | + | + | + | — | + | + | + |

*Example B.—Post-emergence test*

Solvent: 10 parts by weight; acetone
Emulsifier: 5 parts by weight; alkyl aryl polyglycol ether To produce a suitable preparation of active compound, 1 part by weight of active compound is mixed with the stated amount of solvent, the stated amount of emulsifier is added and the concentrate is then diluted with water to the desired concentration.

*Example D.—Tetranychus test*

Solvent: 10 parts by weight acetone.
Emulsifier: 5 parts by weight alkyl aryl polyglycol ether.

To produce a suitable preparation of active compound, 1 part by weight of the active compound is mixed with the stated amount of solvent containing the stated amount of emulsifier and the concentrate so obtained is diluted with water to the desired concentration.

Bush beans (*Phaseolus vulgaris*), which have a height of approximately 10–30 cm., are sprayed with the preparation of the active compound until dripping wet. The bush beans are heavily infested with spider mites (*Tetranychus telarius*) in all stages of development.

After specified periods of time, the effectiveness of the preparation of active compound is determined by counting the dead mites. The degree of destruction thus obtained is expressed as a percentage: 100% means that all the spider mites are killed whereas 0% means none are killed.

The active compounds, their concentrations, the evaluation times and the results obtained can be seen from the following table:

TABLE.—PLANT-DAMAGING MITES

| Active agent | Active agent concentration in percent | Percent killed after 48 hrs. |
|---|---|---|
| 4-α-pyridyl-1,3,5-oxathiazolinone-(2) | 0.2 | 100 |

The following examples are given for the purpose of illustrating the invention.

Example 1

Customary microbe culture media are treated with the graduated amounts of each active agent and, after inoculation with germs or spores of the stated microorganisms kept in an incubator for a prolonged period of time under optimum growth conditions. The limiting concentration is then determined, at which the microorganism is still completely inhibited in its growth.

4-α-pyridyl-1,3,5-oxathiazolinone-(2) still inhibits the growth of the following fungi to 100% extent at the following concentrations:

| Trichophyton gypseum mentagrophytes | Candida albicans | Penicillium commune | Saccharomyces cerevisiae |
|---|---|---|---|
| 5-10 γ/ml | 50 γ/ml | 10-20 γ/ml | 50-100 γ/ml |

Example 2

25 grams chlorine are introduced with ice-cooling and stirring, into a suspension of 36 g. pyridine-2-aldoxime in 150 cm.$^3$ of dry chloroform. The mixture is further stirred for a half hour while cooling, a weak nitrogen current being passed through in order to drive off excess chlorine. The crystals are filtered off with suction and freed from adherent chloroform in a vacuum desiccator.

Yield: 50 g. pyridine-2-hydroximic acid chloride hydrochloride.

50 grams pyridine-2-hydroximic acid chloride hydrochloride are introduced in portions, while stirring and cooling to below 15° C., into a solution of 22.4 g. sodium in 500 cm.$^3$ methanol saturated with hydrogen sulphide. Stirring is continued for a half hour with ice-cooling, for one hour at room temperature, and for one hour at 30–35° C., followed by cooling to room temperature and filtering off the precipitated sodium chloride with suction. The filtrate is almost completely evaporated in vacuum, the residue is dissolved in 250 cm.$^3$ of water. On acidifying, pyridine-2-thiohydroxamic acid separates. It is filtered off with suction and freed from associated amounts of sulphur by dissolving it in a dilute caustic sodium solution, filtering and renewed precipitating with acid.

Yield: 37 g., M.P. 120° C. (alcohol).

37 grams pyridine-2-thiohydroxamic acid are dissolved in a solution of 29 g. sodium hydroxide in 250 cm.$^3$ water. Into this solution phosgene is introduced, with stirring and cooling to 5–10° C., and with the simultaneous dropwise addition of a solution of a further 20 g. sodium hydroxide in 100 cm.$^3$ water, until the mixture reacts neutral. The precipitated crystals are filtered off with suction, washed with water, dried and purified by dissolving in benzene and precipitating with ligroin.

Yield: 27 g. 4-α-pyridyl-1,3,5-oxathiazolinone-(2); M.P. 127° C.

Example 3

Pyridine-3-aldoxime is chlorinated as described in Example 2, and reacted with sodium hydrogen sulphide, whereby pyridine-3-thiohydroxamic acid of M.P. 104° C. is obtained. Its reaction with phosgene leads, as in Example 1, to 4-β-pyridyl-1,3,5-oxathiazolinone-(2) of M.P. 98° C. (benzine).

Example 4

Pyridine-4-aldoxime is chlorinated as described in Example 2, and reacted with sodium hydrogen sulphide, whereby pyridine-4-thiohydroxamic acid of M.P. 130° C. is obtained. Its reaction with phosgene, as in Example 1, leads to 4-γ-pyridyl-1,3,5-oxathiazolinone-(2) of M.P. 106° C. (benzene/ligroin).

We claim:

1. A 4-pyridyl-1,3,5-oxathiazolinone-(2) of the formula

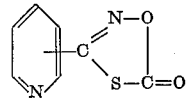

2. 4-α-pyridyl-1,3,5-oxathiazolinone-(2).

3. A process for the production of a 4-pyridyl-1,3,5-oxathiazolinone which comprises reacting a pyridine thiohydroxamic acid in the presence of an acid-binding agent at a temperature between −20 and +150° C. with phosgene and recovering the resulting product.

No references cited.

WALTER A. MODANCE, *Primary Examiner.*

ALAN L. ROTMAN, *Assistant Examiner.*